3,154,990
SLICING APPARATUS HAVING A ROTARY INTERNAL PERIPHERAL FACED SAW BLADE
William C. Woods, Lynn, Mass., assignor to Sylvania Electric Products Inc., a corporation of Delaware
Filed Mar. 16, 1962, Ser. No. 180,102
3 Claims. (Cl. 83—414)

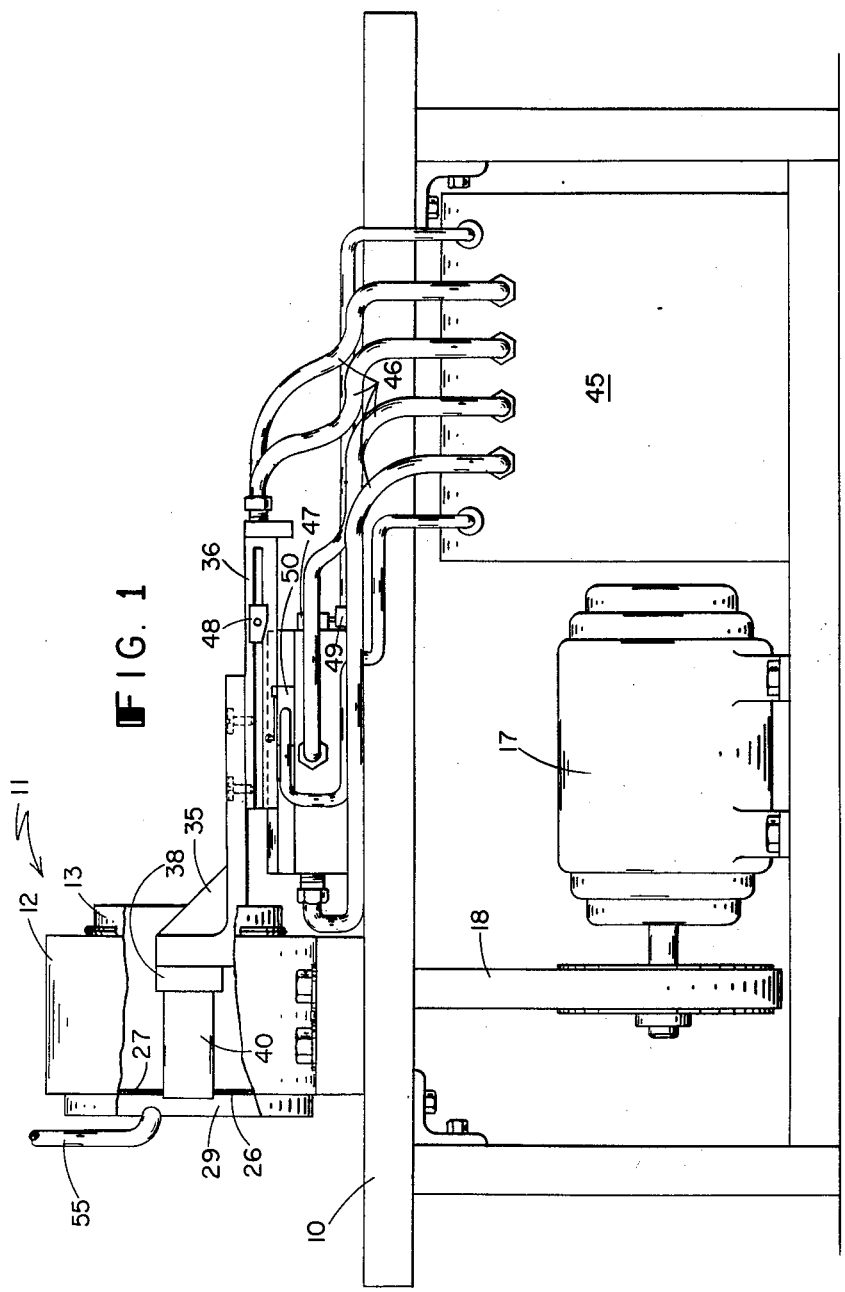
INVENTOR.
WILLIAM C. WOODS
BY
AGENT.

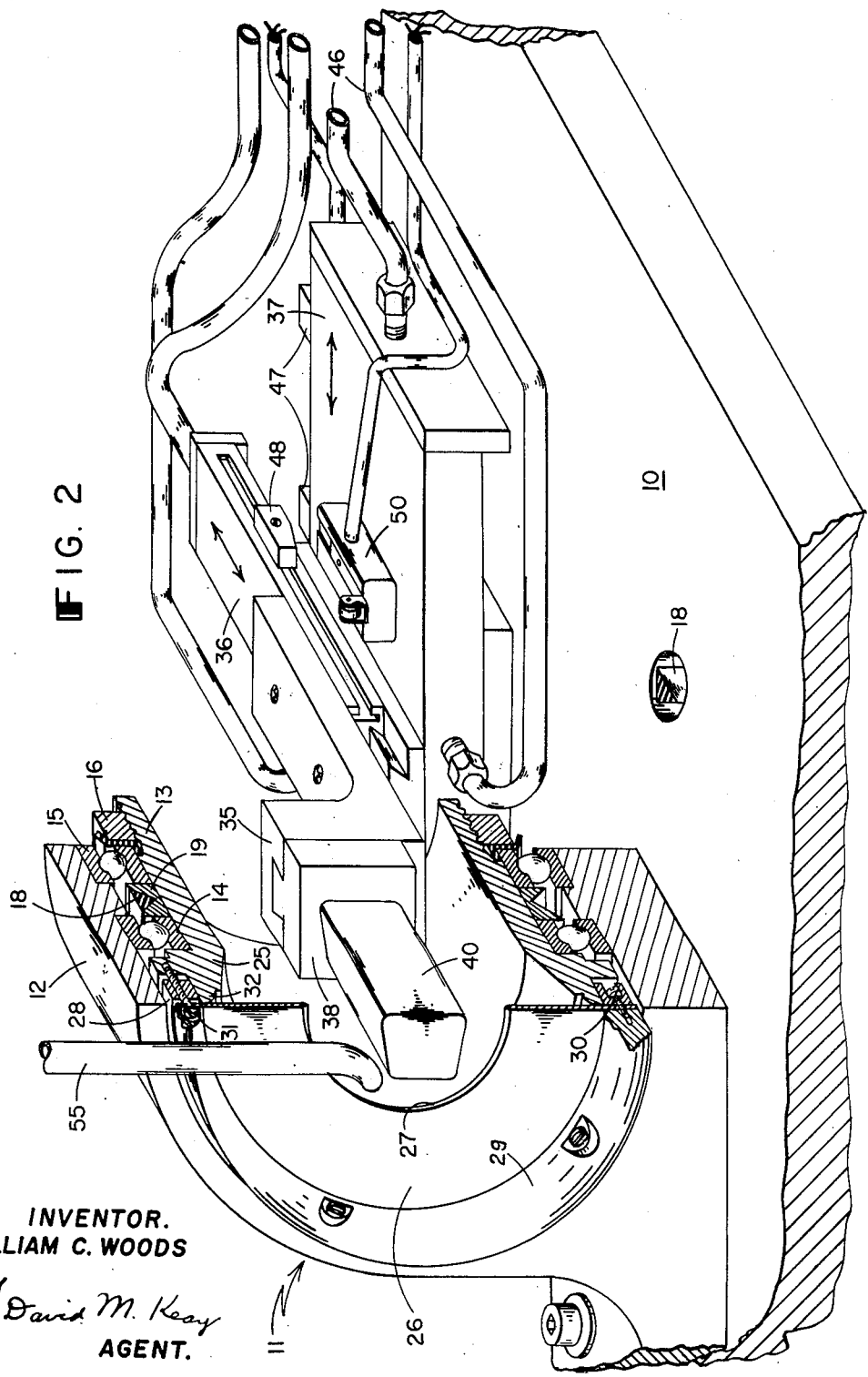

This invention relates to silicing apparatus. More particularly, it is concerned with slicing apparatus employing an annular saw blade having its cutting edge at its inner periphery.

Slicing machines utilizing circular saw blades of annular configuration with the cutting edge at the inner periphery of the saw blade are frequently used in the slicing of materials such as quartz and semiconductor materials. With saws of this general type it has been found possible to slice blocks or ingots of these materials into thin slabs more economically than was possible with conventional disc type saw blades. The saw blades used can be much thinner than the disc type saw blades previously employed, thus reducing the amount of material lost as sawdust. In addition, thinner slabs may be sliced from an ingot without breakage, thus reducing the amount of material which is lost in grinding or chemically etching the slabs to a usable thickness.

Slicing apparatus of the type employing an annular saw which cuts on its inside edge commonly includes a rotating spindle on which a drum-type saw arbor is mounted. The saw blade is mounted on the arbor concentric with the axis of the spindle. The ingot to be sliced or work piece is held in a suitable work support or holder located in front of the saw blade and positioned with the portion to be cut projecting into the opening of the inner periphery of the saw blade. The support is moved in a direction perpendicular to the axis of rotation of the drum, or alternatively the spindle and drum may be moved, to cause the saw blade to cut through the work piece.

In reducing a block of material to a plurality of slabs, the block may be mounted on the work support by one end with the other end projecting into the interior of the arbor drum. Either the rotating blade or the support is then moved to slice off one slab or wafer. The slab drops into the interior of the arbor drum and must be recovered by stopping the apparatus and removing the slab. The saw blade is then repositioned with respect to the block and the cycle repeated to sever another slab from the block. In addition to the inconvenience of stopping the apparatus periodically during the slicing of an entire block, the possibility that the slabs will be broken by the rotating drum is very great.

It is an object of the present invention, therefore, to provide an improved slicing apparatus of the type employing an annular saw blade having its cutting edge at its inner periphery.

It is also an object of the invention to provide an improved slicing apparatus employing an annular saw blade having its cutting edge at its inner periphery in which the slab being severed from the work piece can be observed during slicing and retrieved for inspection or further processing immediately after being severed.

Briefly, slicing apparatus in accordance with the foregoing objects includes a cylindrical arbor which is open at each end. The arbor is rotated about its axis by a suitable driving means. An annular saw with a cutting edge at its inner periphery is mounted on a saw supporting means located at one open end of the arbor. A work piece support means is arranged adjacent the opposite open end of the arbor. The support means is provided with means for holding a work piece at one of its extremities with the other extremity of the work piece, which is to be severed by cutting, extending through and beyond the opening defined by the inner periphery of the saw.

Additional objects, features, and advantages of slicing apparatus according to the invention will be apparent from the following detailed discussion and the accompanying drawings wherein:

FIG. 1 is a side view of slicing apparatus according to the invention showing portions of the arbor broken away, and FIG. 2 is a perspective view partially in cross section illustrating certain portions of the slicing apparatus in FIG. 1.

Slicing apparatus according to the invention as illustrated in FIGS. 1 and 2 includes a main support plate 10 on which a spindle 11 is mounted. The spindle includes a bearing block or an arbor support 12 in which a hollow cylindrical arbor 13 is mounted so as to permit rotation about its axis. The arbor rides on two sets of ball bearings 14 and 15, and is held in position in the support by a retaining ring 16. An electric motor 17 rotates the arbor through a driving belt 18 which passes around a sheave 19 on the outer periphery of the arbor.

Mounted at the forward open end 25 of the hollow cylindrical arbor 13 perpendicular to the axis of the spindle is a thin, flat, annular circular saw blade 26. The cutting edge of the saw blade is at its inner periphery 27. The saw blade is clamped near its outer periphery between an inner ring 28 and an outer ring 29 by clamping screws 30. The saw assembly is attached to the arbor at the forward open end of the arbor by tensioning screws 31. The tensioning screws are tightened so as to draw the outer portion of the blade over the projecting rim 32 at the end of the arbor and thus place the saw blade under proper radial tension. The inner periphery 27 of the saw blade is usually dressed as with diamond particles for slicing materials of the nature of quartz or semiconductor materials.

A work piece support or holder 35 is fixed to an index slide 36. The index slide is moveably mounted on a feed slide 37 which in turn is moveably mounted on the supporting plate 10 rearward of the spindle. Shown positioned in the work piece support 35 is a mounting plate 38. Adhering to the mounting plate is a work piece 40 to be sliced, such as, for example an ingot of a semiconductor material.

The index slide 36 and feed slide 37 are adapted, respectively, for horizontal movement parallel to and perpendicular to the axis of the spindle. Alternatively, the slicing apparatus may be of the type in which the work piece support remains fixed in position with respect to the base plate while the spindle and saw blade are moved perpendicular to and parallel to the axis of the spindle, thus producing the equivalent relative movement between the saw and work piece provided by the slides in the apparatus as shown.

The feed and index slides 37 and 36 are moved along their respective paths according to a predetermined pattern by an hydraulic system 45 connected by flexible hydraulic fluid lines 46 to an hydraulic cylinder (not shown) in each slide. The limits of travel of the slides are controlled by the manual setting of the stop arrangements 47 and 48 on the slides. The stops trigger switches 49 and 50 mounted on the main support plate 10 and feed slide 37, respectively, and the swtches actuate solenoid valves (not shown) controlling the flow of hydraulic fluid to the slide cylinders. Alternatively, a mechanical arrangement including a lead screw and nut may be employed in a known manner to provide the movement of the index slide.

An inlet tube 55 directs a suitable coolant onto the portion of the work piece being cut and onto the cutting edge of the saw blade 26. Other portions of the coolant supply system as well as additional ancillary parts of the slicing apparatus are not shown or discussed. Although these items are part of a complete slicing machine, they are not directly pertinent to the inventive features disclosed herein and, furthermore, their use is well understood in the art.

In slicing an ingot of a semiconductor material into slabs in the slicing apparatus of the invention, the ingot 40 is first attached to a mounting plate 38 with a suitable adhesive. An ingot typically may have a generally trapezoidal cross sectional area of about 1.5 square inches. The mounting plate is placed in the work piece support 35 with the ingot lying generally along the axis of the spindle and oriented as desired with respect to the cutting plane of the saw blade. The index slide 36 is then manually positioned so as to place the portion of the ingot to be cut within the opening of the inner periphery of the saw blade. Since the work support is located to the rear of the spindle and the ingot extends forward from the support, only the portion of the ingot to be sliced from the ingot extends through the opening of the saw blade.

The saw blade which may be approximately 5 inches in diameter with an inner diameter of 2 inches is rotated at a speed of about 6,000 revolutions per minute in a counterclockwise direction as viewed in FIG 2. Advancing movement of the feed slide 37 is started by opening the appropriate valve in the hydraulic system 45 so as to cause fluid to flow into the feed slide cylinder through the proper line. The feed slide 37 is advanced toward the left as viewed in FIG. 2 carrying the work piece support along a path perpendicular to the axis of the spindle and parallel to the plane of the saw blade. The cutting edge of the saw blade and the portion of the ingot to be cut are thus brought into cutting engagement. The advancing movement of the feed slide is continued until the slab protruding forward of the saw blade is severed from the ingot. The slab falls off the forward surface of the saw blade onto the base plate, or into another suitable receptacle, from which it may be recovered immediately.

When the ingot has been sliced through and the feed slide 37 reaches the limit of its travel, the pre-set stop arrangement 47 triggers the feed slide switch 49. The switch actuates solenoid valves in the system which stop the advancing movement of the feed slide, permit a predetermined volume of hydraulic fluid to flow into the index slide cylinder thus retracting the index slide 36 a predetermined distance, and then start the retracting movement of the feed slide at a rapid rate. Retraction of the index slide before the feed slide is withdrawn insures that the newly exposed surface of the ingot will not be contacted by the rotating saw blade.

After the feed slide has been retracted so that the work piece assumes its previous position relative to the axis of the spindle but farther from the plane of the saw blade, the feed slide stop arrangement 47 triggers the feed slide switch 49. The hydraulic valves are thereby actuated so as to stop the feed slide 37, advance the index slide 36 a predetermined distance, and then start the advancing movement of the feed slide. The index slide is advanced so as to move the ingot forward a distance equal to the distance of retraction plus the thickness of a saw cut and the thickness of the slab to be severed. The thickness of the saw blade may be as thin as about .006 inch and the thickness of a slab about the same.

The complete operating cycle of advancing the feed slide, withdrawing the index slide, withdrawing the feed slide, and advancing the index slide is repeated automatically and continuously until all of the ingot except the end portion adhering to the mounting plate is reduced to slabs. When the slicing of the ingot has been completed, the pre-set index slide stop 48 triggers the index slide switch 50 thereby stopping the operation of the apparatus.

What is claimed is:

1. Slicing apparatus including a hollow cylindrical arbor having openings at each end, an arbor support for supporting said arbor for rotation about its axis, driving means engaging the outer periphery of said arbor for rotating the arbor, a saw blade mounting at one open end of the said arbor for attaching an annular saw blade having its cutting edge at its inner periphery, work support means adapted to extend through the other open end of the arbor into the arbor for positioning a portion of the work piece to be cut within the opening defined by the inner periphery of the saw blade, means for advancing the work support means relative to the arbor in a direction parallel to the axis of the arbor to position each portion of the work piece in succession within the opening defined by the inner periphery of the saw blade, and feeding means for providing relative movement between the arbor and the work support means in a direction perpendicular to the axis of the arbor whereby the portion of the work piece within the opening defined by the inner periphery of the saw blade is fed into cutting engagement with the cutting edge of the annular saw.

2. Slicing apparatus including a hollow cylindrical arbor having an open forward end and an open rearward end, an arbor support for supporting said arbor for rotation about its axis, driving means engaging the outer periphery of said arbor for rotating the arbor, an annular saw blade having its cutting edge at its inner periphery mounted at the forward open end of the arbor coaxial with the arbor, a work piece support located at a position rearward of the rearward end of the arbor, said work piece support including means for holding a work piece at one extremity thereof and being adapted to extend through the open rearward end of the arbor into the arbor for positioning each portion of the work piece forward of said one extremity within the opening defined by the inner periphery of the saw blade, and feeding means for providing relative movement between the arbor and work piece support in a direction perpendicular to the axis of the arbor whereby the portion of the work piece to be cut is brought into cutting engagement with the cutting edge of the saw blade.

3. Slicing apparatus including a hollow cylindrical arbor having an open forward end and an open rearward end, an arbor support for supporting said arbor for rotation about its axis, driving means engaging the outer periphery of said arbor for rotating the arbor, a thin, flat, annular saw blade having its cutting edge at its inner periphery mounted at the forward open end of the arbor coaxial with the arbor and lying in a plane perpendicular to the axis of the arbor, a work piece support located at a position rearward of the rearward end of the arbor, said work piece support including means for holding a work piece at one extremity thereof and being adapted to extend through the open rearward end of the arbor into the arbor for positioning each portion of the work piece forward of said one extremity within the opening defined by the inner periphery of the saw blade, work piece feeding means for providing relative advancing movement between the arbor and the work piece support in a direction parallel to the plane of the saw blade for a predetermined distance whereby the portion of the work piece to be cut positioned within the opening defined by the inner periphery of the saw blade is sliced through by the cutting edge of the saw blade, and for providing relative withdrawing movement between the arbor and the work piece support in a direction opposite to the direction of advancing movement for a distance equal to the predetermined distance, and work piece indexing means for providing relative retracting movement between the arbor and the work piece support in a direction parallel to the axis of the arbor for a predetermined distance subsequent to completion of the relative advancing movement between the arbor and the work piece support and prior to the relative withdrawing movement, and for providing relative advancing movement between the arbor and the work piece support in a direction parallel to the axis of the arbor for a distance greater than said last mentioned predetermined distance subsequent to completion of the relative withdrawing movement between the arbor and the work piece support, whereby each portion of the work piece forward of said one extremity is positioned in succession within the opening defined by the inner periphery of the saw blade and is sliced through by the cutting edge of the saw blade thus reducing the work piece to a plurality of separate slabs.

References Cited in the file of this patent

UNITED STATES PATENTS

| | | |
|---|---|---|
| 480,461 | Gilmore | Aug. 9, 1892 |
| 775,556 | Dieckman | Nov. 22, 1904 |
| 1,063,789 | Gorton | June 3, 1913 |
| 1,432,621 | Mitchell | July 25, 1922 |
| 1,437,494 | Clemson | Dec. 9, 1922 |
| 2,136,792 | Folk | Nov. 15, 1938 |
| 2,415,233 | Brustowsky | Feb. 4, 1947 |
| 2,611,406 | Preble | Sept. 23, 1952 |
| 2,744,553 | Folk | May 8, 1956 |
| 2,898,962 | Burnett | Aug. 11, 1959 |
| 2,922,280 | Rehlander | Jan. 26, 1960 |